(12) United States Patent
Mitadera et al.

(10) Patent No.: US 8,895,121 B2
(45) Date of Patent: Nov. 25, 2014

(54) POLYAMIDE RESIN COMPOSITION AND MOLDED ARTICLE

(75) Inventors: Jun Mitadera, Kanagawa (JP); Masashi Kurokawa, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 99 days.

(21) Appl. No.: 13/376,468

(22) PCT Filed: Jun. 8, 2010

(86) PCT No.: PCT/JP2010/059719
§ 371 (c)(1),
(2), (4) Date: Dec. 6, 2011

(87) PCT Pub. No.: WO2010/143638
PCT Pub. Date: Dec. 16, 2010

(65) Prior Publication Data
US 2012/0094048 A1  Apr. 19, 2012

(30) Foreign Application Priority Data

Jun. 8, 2009 (JP) ................................. 2009-137467

(51) Int. Cl.
*B32B 1/08* (2006.01)
*C08K 5/18* (2006.01)
*C08L 77/06* (2006.01)
*C08G 69/26* (2006.01)
*C08K 5/13* (2006.01)
*C08K 5/1575* (2006.01)
*C08K 5/20* (2006.01)

(52) U.S. Cl.
CPC ............... *C08L 77/06* (2013.01); *C08G 69/265* (2013.01); *C08K 5/13* (2013.01); *C08K 5/18* (2013.01); *C08K 5/1575* (2013.01); *C08K 5/20* (2013.01)
USPC .......................... 428/36.9; 428/35.7; 524/108

(58) Field of Classification Search
USPC .................................. 428/36.9, 35.7; 524/108
See application file for complete search history.

(56) References Cited

U.S. PATENT DOCUMENTS

| 4,957,953 | A | * | 9/1990 | Kikkawa et al. | ................. | 524/99 |
| 5,164,258 | A | * | 11/1992 | Shida et al. | ................. | 428/319.3 |
| 5,216,054 | A | * | 6/1993 | Iwanami et al. | ............... | 524/120 |
| 6,319,986 | B1 | | 11/2001 | Amimoto et al. | | |
| 6,569,927 | B1 | * | 5/2003 | Gelbin | ........................... | 524/111 |

FOREIGN PATENT DOCUMENTS

| JP | 59 027948 | 2/1984 |
| JP | 10 158461 | 6/1998 |
| JP | 2000 80270 | 3/2000 |
| JP | 2001 329169 | 11/2001 |
| JP | 2007 031630 | 2/2007 |
| JP | 2007 039577 | 2/2007 |
| JP | 2008 275155 | 11/2008 |
| JP | 2009 035731 | 2/2009 |

OTHER PUBLICATIONS

Machine Translation of JP 2001-329169 (Nov. 2001).*
U.S. Appl. No. 13/376,737, filed Dec. 7, 2011, Mitadera, et al.
International Search Report issued Aug. 24, 2010 in PCT/JP10/59719 filed Jun. 8, 2010.

* cited by examiner

*Primary Examiner* — Erik Kashnikow
(74) *Attorney, Agent, or Firm* — Oblon, Spivak, McClelland, Maier & Neustadt, L.L.P.

(57) ABSTRACT

Disclosed is a polyamide resin composition having excellent gas barrier properties and heat aging resistance, which contains (A) a polyamide composed of a diamine unit containing a 1,3-bis(aminomethyl)cyclohexane unit and a dicarboxylic unit and at least either of (B) an aromatic secondary amine based compound and (D) a phenol based antioxidant and has an oxygen permeability coefficient of not more than 1.5 cc·mm/m²·day·atm at 23° C. and 75% RH.

18 Claims, No Drawings

POLYAMIDE RESIN COMPOSITION AND MOLDED ARTICLE

TECHNICAL FIELD

The present invention relates to a polyamide resin composition having excellent heat aging resistance and gas barrier properties and to a molded article comprising the same.

BACKGROUND ART

In view of the fact that polyamide resins are excellent in characteristics such as strength, rigidity, solvent resistance, moldability, and the like, they are used as injection molding materials such as automobile or electric and electronic parts and the like, or packaging materials for foodstuffs, beverages, chemicals, electronic parts, or the like. Above all, polyamides containing an m-xylene group in a polymer principal chain are high in rigidity and also excellent in barrier properties against various gases or chemicals or the like, and hence, they are widely used as injection molding materials or packaging materials.

However, in the polyamides containing an m-xylene group in a polymer principal chain, in view of the fact that a radical is easily formed at the benzyl methyl position from the structural standpoint, they are low in heat stability or heat aging resistance as compared with polyamides such as nylon 6 and the like. For that reason, there are uses to which the polyamides containing an m-xylene group are hardly applied as a molding material, depending upon a severe use environment or condition, for example, a high-temperature environment, etc.

In recent years, in the fields of automobile parts and the like, in which gas barrier properties and heat aging resistance are required, although utilization of polyamides is studied, for the foregoing reasons, it was difficult to apply the polyamides containing an m-xylene group in a polymer principal chain.

For that reason, there are made proposals for improving the heat stability or heat aging resistance of polyamides. For example, Patent Document 1 discloses a heat-resistant polyamide composed of a polyamide containing an m-xylene group in a polymer principal chain, a copper compound, a halide, a hindered phenol and/or a hindered amine, and an organophosphorus compound. However, this method is a method suited for stretched fibers, but it was an unsatisfactory technique for enhancing the heat aging resistance of injection molded articles or extrusion molded articles to be used for automobile parts and the like.

Also, for example, Patent Document 2 proposes a method in which on the occasion of molding processing of a polyamide containing an m-xylene group in a polymer principal chain, at least one member selected from a lubricant, an organophosphorus based stabilizer, a hindered phenol compound, and a hindered amine compound is added in an amount of from 0.005 to 0.5 parts by mass, thereby preventing gelation of the polyamide from occurring. However, this method is a technique for preventing the gelation from occurring during the molding processing, but it was an unsatisfactory technique for enhancing the heat aging resistance after molding.

Also, for example, Patent Document 3 describes, as a molding material for precision parts, an example in which an aromatic secondary amine based compound is incorporated as a heat stabilizer into a polyamide resin. However, this technique is a technique suited for nylon 66, but effects against polyamides having a different polymer skeleton were not reviewed.

In the light of the above, in particular, with respect to the foregoing polyamides having excellent gas barrier properties, it is the present state that a technique for enhancing the heat aging resistance while keeping the gas barrier properties has not been found yet.

PRIOR ART DOCUMENTS

Patent Documents

Patent Document 1: JP-A-10-130497
Patent Document 2: JP-A-2001-164109
Patent Document 3: JP-A-2006-28327

SUMMARY OF THE INVENTION

Problem to be Solved by the Invention

An object of the present invention is to provide a polyamide resin composition which is able to solve the foregoing problems and which is excellent in gas barrier properties and heat aging resistance and a molded article comprising the same.

Means for Solving the Problem

The present inventors made extensive and intensive investigations. As a result, it has been found that the foregoing problem is solved by a polyamide resin composition comprising (A) a polyamide composed of a diamine unit containing a 1,3-bis(aminomethyl)cyclohexane unit and a dicarboxylic acid unit and at least either of (B) an aromatic secondary amine based compound and (D) a phenol based antioxidant, the polyamide resin composition having an oxygen permeability coefficient of not more than 1.5 cc·mm/m$^2$·day·atm at 23° C. and 75% RH.

Effect of the Invention

The polyamide resin composition of the present invention is excellent in gas barrier properties and heat aging resistance. A molded article comprising the same can be utilized for automobile parts and the like, in which gas barrier properties and heat aging resistance are required, and its industrial value is very high.

MODES FOR CARRYING OUT THE INVENTION

Polyamide Resin Composition

The polyamide resin composition of the present invention comprises (A) a polyamide composed of a diamine unit containing a 1,3-bis(aminomethyl)cyclohexane unit and a dicarboxylic acid unit in a skeleton thereof and at least either of (B) an aromatic secondary amine based compound and (D) a phenol based antioxidant, the polyamide resin composition having an oxygen permeability coefficient of not more than 1.5 cc·mm/m$^2$·day·atm at 23° C. and 75% RH. Incidentally, in the present invention, the 1,3-bis(aminomethyl)cyclohexane unit refers to a constituent unit derived from 1,3-bis(aminomethyl)cyclohexane that is a raw material. Also, the "diamine unit" refers to a constituent unit derived from a raw material diamine component of the polyamide, and the "dicarboxylic acid unit" refers to a constituent unit derived from a raw material dicarboxylic acid of the polyamide. It is preferable that the polyamide resin composition further comprises (C) an organic sulfur based compound.

The polyamide (A) which is used in the present invention is a polyamide containing a 1,3-bis(aminomethyl)cyclohexane unit in a skeleton thereof. The polyamide (A) is excellent in gas barrier properties and also excellent in gas barrier properties under a high humidity. Also, in view of the fact that the 1,3-bis(aminomethyl)cyclohexane unit does not have a benzyl methylene position in a skeleton thereof, excellent heat aging resistance is exhibited. As the polyamide (A), for example, there are exemplified polyamides obtained by polycondensation of a diamine component containing 1,3-bis (aminomethyl)cyclohexane and a dicarboxylic acid component of every sort, and so on. Such a polyamide may be a homopolymer or a copolymer. The subject polyamide has a high gas barrier performance and is favorable in heat resistance, heat aging resistance, and molding processability. The polyamide (A) can be used singly or as a blend of a plurality of the resins.

In the present invention, a content of the 1,3-bis(aminomethyl)cyclohexane unit in the diamine unit is preferably 30% by mole or more, more preferably 50% by mole or more, still more preferably 70% by mole or more, especially preferably 80% by mole or more, and most preferably 90% by mole or more.

When the content of the 1,3-bis(aminomethyl)cyclohexane unit in the diamine unit is 30% by mole or more, the heat aging resistance, gas barrier properties and gas barrier properties under a high humidity of the polyamide (A) can be made favorable.

As diamine components other than 1,3-bis(aminomethyl)cyclohexane which can be used for the production of the polyamide (A), there can be exemplified aliphatic diamines such as tetramethylenediamine, pentamethylenediamine, 2-methylpentanediamine, hexamethylenediamine, heptamethylenedimeine, octamethylenedimeine, nonamethylenedimeine, decamethylenedimeine, dodecamethylenedimeine, 2,2,4-trimethyl-hexamethylenedimeine, 2,4,4-trimethylhexamethylenedimeine, and the like; alicyclic diamines such as 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, bis(aminomethyl)tricyclodecane, and the like; aromatic ring-containing diamines such as bis(4-aminophenyl)ether, p-phenylenediamine, m-xylylenediamine, p-xylylenediamine, bis(aminomethyl)naphthalene, and the like; and so on. However, it should not be construed that the present invention is limited thereto.

In the polyamide (A) in the present invention, a content of an α,ω-linear aliphatic dicarboxylic acid unit having from 4 to 20 carbon atoms in the dicarboxylic acid unit is preferably 50% by mole or more, more preferably 70% by mole or more, still more preferably 80% by mole or more, and especially preferably 90% by more or more.

By regulating the content of the α,ω-linear aliphatic dicarboxylic acid unit having from 4 to 20 carbon atoms in the dicarboxylic acid unit to 50% by mole or more, the gas barrier properties and gas barrier properties under a high humidity of the polyamide (A) can be made favorable.

As the dicarboxylic acid component which can be used for the production of the polyamide (A), there can be exemplified α,ω-linear aliphatic dicarboxylic acids having from 4 to 20 carbon atoms such as succinic acid, glutaric acid, pimelic acid, suberic acid, azelaic acid, adipic acid, sebacic acid, undecane diacid, dodecane diacid, and the like; aromatic dicarboxylic acids such as terephthalic acid, isophthalic acid, 2,6-naphthalenedicarboxylic acid, and the like; and so on. However, it should not be construed that the present invention is limited thereto.

Also, as the foregoing α,ω-linear aliphatic dicarboxylic acid having from 4 to 20 carbon atoms, adipic acid and sebacic acid are especially preferable.

In addition to the diamine component and the dicarboxylic acid component, a lactam such as c-caprolactam, laurolactam, and the like, or an aliphatic aminocarboxylic acid such as aminocaproic acid, aminoundecanoic acid, and the like can also be used as the copolymerization component within the range where the effects of the present invention are not impaired.

Also, among the foregoing materials, as the polyamide (A) which can be preferably utilized in the present invention, there are exemplified polyamides obtained by polycondensation of a diamine component containing 30% by mole or more of 1,3-bis(aminomethyl)cyclohexane and a dicarboxylic acid component containing 50% by mole or more of an α,ω-linear aliphatic dicarboxylic acid having from 4 to 20 carbon atoms. As such a polyamide, for example, there are exemplified a polyamide obtained by polycondensation of a diamine containing mainly 1,3-bis(aminomethyl)cyclohexane and adipic acid (hereinafter referred to as "polyamide (a)"); a polyamide obtained by polycondensation of a diamine containing mainly 1,3-bis(aminomethyl)cyclohexane and sebacic acid (hereinafter referred to as "polyamide (b)"); a polyamide obtained by polycondensation of a diamine containing mainly 1,3-bis(aminomethyl)cyclohexane, adipic acid and sebacic acid (hereinafter referred to as "polyamide (c)"); and so on. Here, it is meant by the foregoing term "mainly" that the content is 50% by mole or more of the whole of the diamine.

Also, as the foregoing polyamide (a), there can be exemplified a polyamide obtained by polycondensation of 1,3-bis(aminomethyl)cyclohexane and adipic acid; and as the polyamide (b), there can be exemplified a polyamide obtained by polycondensation of 1,3-bis(aminomethyl)cyclohexane and sebacic acid.

In the polyamide (c) obtained by polycondensation of mainly 1,3-bis(aminomethyl)cyclohexane, adipic acid and sebacic acid, by using adipic acid and sebacic acid as the dicarboxylic acid component, its melting point, heat resistance, gas barrier properties and crystallinity can be arbitrarily controlled, and hence, such is preferable. In the case where it is intended to lower the crystallinity, or in the case where the system is rendered in an amorphous state, a mixing ratio of adipic acid and sebacic acid ((sebacic acid)/(adipic acid) molar ratio) is preferably from 80/20 to 30/70, and more preferably from 70/30 to 40/60. In the case of attaching importance to the gas barrier properties, as to the foregoing mixing ratio, it is effective to reduce a mixing proportion of sebacic acid. Specifically, the mixing ratio is preferably not more than 50/50, more preferably not more than 40/60, and still more preferably not more than 30/70. In the case of attaching importance to the heat resistance, as to the foregoing mixing ratio, it is effective to reduce a mixing proportion of sebacic acid. Specifically, the mixing ratio is preferably not more than 60/40, more preferably not more than 40/60, and still more preferably not more than 30/70.

Also, as the polyamide (A) which can be preferably utilized in the present invention, there can be exemplified a mixture of the foregoing polyamide (a) and polyamide (b). By mixing the foregoing polyamide (a) and polyamide (b), the heat resistance and gas barrier properties can be arbitrarily controlled while keeping the crystallinity. In the case of attaching importance to the gas barrier properties, as to a mixing ratio of the polyamide (a) and the polyamide (b) ((polyamide (b))/(polyamide (a)) mass ratio), it is effective to reduce a mixing proportion of the polyamide (b). More specifically, the mixing ratio is preferably not more than 50/50, more preferably not more than 40/60, and still more preferably not more than 30/70.

Also, there are an application for which crystallinity is required; and an application for which low crystallinity or amorphous nature is required, depending upon the application of a molded article. For such an application, by controlling the mixing ratio of the dicarboxylic acid ((sebacic acid)/(adipic acid)), or the mixing ratio of the polyamide ((polyamide (b)/(polyamide (a)), as described above, the crystallinity can be suitably controlled.

Also, by adding a 1,4-bis(aminomethyl)cyclohexane unit to the 1,3-bis(aminomethyl)cyclohexane unit as the diamine unit, the heat resistance can be enhanced through elevation of the melting point or glass transition point of the polyamide (A). So far as a content of the 1,4-bis(aminomethyl)cyclohexane unit falls within the range not exceeding 70% by mole of the diamine unit, by adding it in an arbitrary proportion, the heat resistance can be controlled.

The polyamide (A) is not particularly limited with respect to its production method, and it can be produced by the conventionally known method and polymerization condition. A small amount of a monoamine or a monocarboxylic acid may be added as a molecular weight modifier at the time of polycondensation of the polyamide. For example, the polyamide (A) is produced by a method in which a nylon salt composed of 1,3-bis(aminomethyl)cyclohexane and adipic acid is subjected to temperature elevation in a pressurized state in the presence of water and polymerized in a molten state while removing added water and condensed water. The polyamide (A) is also produced by a method in which 1,3-bis(aminomethyl)cyclohexane is added directly to adipic acid in a molten state, and the mixture is subjected to polycondensation at atmospheric pressure. In that case, for the purpose of keeping the reaction system in a uniform molten state, 1,3-bis(aminomethyl)cyclohexane is continuously added to adipic acid, and meanwhile, the polycondensation is allowed to proceed while subjecting the reaction system to temperature elevation such that the reaction temperature is not lower than the melting points of the formed oligoamide and polyamide.

Also, the polyamide (A) may be produced by carrying out solid phase polymerization for performing a heat treatment in a solid phase state, after being produced by a melt polymerization method. The polyamide (A) is not particularly limited with respect to its production method, and it can be produced by the conventionally known method and polymerization condition.

A number average molecular weight (Mn) of the polyamide (A) is preferably from 18,000 to 70,000, and more preferably from 20,000 to 50,000 in terms of a value as reduced into PMMA (polymethyl methacrylate) by means of GPC (gel permeation chromatography) measurement. When the number average molecular weight (Mn) falls within the range of from 18,000 to 70,000, favorable heat resistance and molding processability are obtained.

A glass transition temperature (Tg) of the polyamide (A) is preferably from 80 to 120° C., more preferably from 85 to 120° C., and still more preferably from 90 to 120° C. When the glass transition point (Tg) falls within the range of from 80 to 120° C., favorable heat resistance is obtained.

Incidentally, the glass transition temperature can be measured by a DSC (differential scanning calorimetry) method. For example, the measurement can be carried out by taking about 5 mg of a sample and heating it at from room temperature to 300° C. under a condition at a temperature elevation rate of 10° C./min by using DSC-60, manufactured by Shimadzu Corporation. As an atmosphere gas, nitrogen may be allowed to flow at 30 mL/min. As the glass transition temperature, a so-called midpoint temperature (Tgm) was employed. Incidentally, as widely known, the Tgm is a midpoint temperature of intersecting points of tangent lines of base lines of a glass state and a supercooled state (rubber state) and a tangent line of a slope of transition in a DSC curve.

To the polyamide (A), a phosphorus compound can be added for the purpose of enhancing the processing stability at the time of melt molding, or for the purpose of preventing coloration of the polyamide (A). As the phosphorus compound, phosphorus compounds containing an alkali metal or an alkaline earth metal are suitably used, and examples thereof include phosphoric acid salts, hypophosphorous acid salts and phosphorous acid salts of an alkali metal or an alkaline earth metal such as sodium, magnesium, calcium, and the like. In particular, those using a hypophosphorous acid salt of an alkali metal or an alkaline earth metal are preferably used because they are especially excellent in an effect for preventing coloration of the polyamide. A concentration of the phosphorus compound in the polyamide is preferably from 1 to 1,000 ppm, more preferably from 1 to 500 ppm, still more preferably from 1 to 350 ppm, and especially preferably from 1 to 200 ppm in terms of phosphorus atom.

The polyamide resin composition of the present invention contains (B) an aromatic secondary amine compound and/or (D) a phenol based antioxidant as a constituent component(s) other than the polyamide (A). In the aromatic secondary amine compound (B), compounds having a diphenylamine skeleton, compounds having a phenylnaphthylamine skeleton, and compounds having a dinaphthylamine skeleton are preferable; and compounds having a diphenylamine skeleton and compounds having a phenylnaphthylamine skeleton are more preferable.

Specifically, there can be exemplified compounds having a diphenylamine skeleton such as N-phenyl-1-naphthylamine, p,p'-dialkyldiphenylamine (carbon number of alkyl group: 8 to 14), octylated diphenylamine, 4,4'-bis(α,α-dimethylbenzyl)diphenylamine, p-(p-toluenesulfonylamido)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, and the like; compounds having a phenylnaphthylamine skeleton such as N-phenyl-1-naphthylamine, N,N'-di-2-naphthyl-p-phenylenediamine, and the like; compounds having a dinaphthylamine skeleton such as 2,2'-dinaphthylamine, 1,2'-dinaphthylamine, 1,1'-dinaphthylamine, and the like; and mixtures thereof. However, it should not be construed that the present invention is limited thereto. Of these, 4,4'-bis(α,α-dimethylbenzyl)diphenylamine, N,N'-di-2-naphthyl-p-phenylenediamine, and N,N'-diphenyl-p-phenylenediamine are more preferable; and N,N'-di-2-naphthyl-p-phenylenediamine and 4,4'-bis(α,α-dimethylbenzyl)diphenylamine are especially preferable.

As the foregoing phenol based antioxidant (D), there can be exemplified 2,2'-methylenebis(4-methyl-6-t-butylphenol), 4,4'-butylidenebis(6-t-butyl-3-methylphenol), 4,4'-thiobis(6-t-butyl-3-methylpheol), 3,9-bis[2-[3-(3-t-butyl-4-hydroxy-5-methylphenyl)propionyloxy]-1,1-dimethylethyl]-2,4,8,10-tetraoxaspiro[5.5]undecane, triethylene glycol-bis[3-(3-t-butyl-5-methyl-4-hydroxyphenyl)propionate], 1,6-hexanediol-bis[3-(3,5-di-t-butyl-4-hydroxyphenyl) propionate], 2,4-bis-(n-octylthio)-6-(4-hydroxy-3,5-di-t-butylanilino)-1,3,5-triazine, pentaerythrityl.tetrakis[3-(3,5-di-t-butyl-4-hydroxyphenyl)propionate], 2,2-thiodiethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamide), 3,5-di-t-butyl-4-hydroxybenzyl phosphonato-diethyl ester, 1,3,5-trimethyl-2,4,6-tris(3,5-di-t-butyl-4-hydroxybenzyl)benzene, tris-(3,5-di-t-butyl-4-hydroxybenzyl)-isocyanurate, 2,4-bis[(octylthio)methyl]-o-cresol, isooctyl-3-(3,5-di-t-butyl-4-hydroxyphenyl)propionate, and so on. However, it should not be construed that the present invention is limited thereto. Of these, 3,9-bis[2-[3-(3-t-butyl-4-hydroxy-5-methylphenyl)propionyloxy]-1,1-dimethylethyl]-2,4,8,10-tetraoxaspiro[5.5]undecane and N,N'-hexamethylenebis(3,5-di-t-butyl-4-hydroxy-hydrocinnamide) are preferable.

A blending amount of such an aromatic secondary amine compound (B) and/or phenol based antioxidant (D) is preferably from 0.01 to 5 parts by mass, more preferably from 0.1 to 2.0 parts by mass, and especially preferably from 0.2 to 1.0 part by mass based on 100 parts by mass of the polyamide (A). When the blending amount falls within the range of from 0.01 to 5 parts by mass, an effect for enhancing the heat aging resistance is brought about, and the surface of a molded article is favorable, and hence, such is preferable.

It is preferable that the polyamide resin composition of the present invention further contains (C) an organic sulfur based compound. Among organic sulfur based compounds, mercaptobenzoimidazole based compounds, dithiocarbamic acid based compounds, thiourea based compounds, and organic thio acid based compounds are preferable; and mercaptobenzoimidazole based compounds and organic thio acid based compounds are more preferable.

Specifically, there can be exemplified mercaptobenzoimidazole based compounds such as 2-mercaptobenzoimidazole, 2-mercaptomethylbenzimidazole, metal salts of 2-mercaptobenzimidazole, and the like; organic thio acid based compounds such as dilauryl-3,3'-thiodipropionate, dimyristyl-3,3'-thiodipropionate, distearyl-3,3'-thiodipropionate, pentaerythritol tetrakis(3-laurylthiopropionate), and the like; dithiocarbamic acid based compounds such as metal salts of diethyldithiocarbamic acid, metal salts of dibutyldithiocarbamic acid, and the like; thiourea based compounds such as 1,3-bis(dimethylaminopropyl)-2-thiourea, tributylthiourea, and the like; and mixtures thereof. However, it should not be construed that the present invention is limited thereto. Of these, 2-mercaptobenzoimidazole, 2-mercaptomethylbenzimidazole, dimyristyl-3,3'-thiodipropionate, distearyl-3,3'-thiodipropionate, and pentaerythritol tetrakis(3-laurylthiopropionate) are preferable; pentaerythritol tetrakis(3-laurylthiopropionate), 2-mercaptobenzimidazole, and dimyristyl-3,3'-thiodipropionate are more preferable; and pentaerythritol tetrakis(3-laurylthiopropionate) is especially preferable.

A blending amount of such an organic sulfur based compound (C) is preferably from 0.01 to 5 parts by mass, more preferably from 0.1 to 2.0 parts by mass, and especially preferably from 0.2 to 1.0 part by mass based on 100 parts by mass of the polyamide (A). When the blending amount falls within the range of from 0.01 to 5 parts by mass, an effect for enhancing the heat aging resistance is brought about, and the surface of a molded article is favorable, and hence, such is preferable.

As the foregoing aromatic secondary amine based compound (B) and phenol based antioxidant (D), one kind or two or more kinds thereof can be used. Furthermore, it is preferable that the aromatic secondary amine based compound (B) and/or the phenol based antioxidant (D) and the organic sulfur based compound (C) are used in combination. By using the organic sulfur based compound (C) in combination, the heat aging resistance of the polyamide resin composition becomes more favorable as compared with that in the case of only the aromatic secondary amine based compound (B) and/or the phenol based antioxidant (D).

More specifically, as a suitable combination of the aromatic secondary amine based compound (B) and the organic sulfur based compound (C), there is exemplified a combination of, as the aromatic secondary amine based compound (B), at least one member selected from 4,4'-bis(α,α-dimethylbenzyl)diphenylamine and N,N'-di-2-naphthyl-p-phenylenediamine; and, as the organic sulfur based compound (C), at least one member selected from pentaerythritol tetrakis(3-laurylthiopropionate), 2-mercaptobenzimidazole, and dimyristyl-3,3'-thiodipropionate. Furthermore, as to a suitable combination of the aromatic secondary amine based compound (B) and the organic sulfur based compound (C), there are exemplified N,N'-di-2-naphthyl-p-phenylenediamine as the aromatic secondary amine based compound (B) and pentaerythritol tetrakis(3-laurylthiopropionate) as the organic sulfur based compound (C).

More specifically, as a suitable combination of the phenol based antioxidant (D) and the organic sulfur based compound (C), there is exemplified a combination of, as the phenol based antioxidant (D), at least one member selected from 3,9-bis[2-[3-(3-t-butyl-4-hydroxy-5-methylphenyl)propionyloxy]-1,1-dimethylethyl]-2,4,8,10-tetraoxaspiro[5.5]undecane and N,N'-hexamethylenebis(3,5-di-t-butyl-4-hydroxy-hydrocinnamide) and, as the organic sulfur based compound (C), at least one member selected from pentaerythritol tetrakis(3-laurylthiopropionate), 2-mercaptobenzimidazole, and dimyristyl-3,3'-thiodipropionate. As to a more suitable combination of the phenol based antioxidant (D) and the organic sulfur based compound (C), there are exemplified 3,9-bis[2-[3-(3-t-butyl-4-hydroxy-5-methylphenyl)propionyloxy]-1,1-dimethylethyl]-2,4,8,10-tetraoxaspiro[5.5]undecane as the phenol based antioxidant (D) and pentaerythritol tetrakis(3-laurylthiopropionate) as the organic sulfur based compound (C).

Also, a content ratio of the foregoing aromatic secondary amine based compound (B) and organic sulfur based compound (C) ((B)/(C) mass ratio) in the polyamide resin composition is preferably from 0.5 to 10.0, and more preferably from 0.5 to 8.0. Also, a content ratio of the foregoing phenol based antioxidant (D) and organic sulfur based compound (C) ((D)/(C) mass ratio) in the polyamide resin composition is preferably from 0.5 to 10.0. Furthermore, in the case of using the aromatic secondary amine based compound (B) and the phenol based antioxidant (D) in combination, a content ratio of the aromatic secondary amine based compound (B) and the phenol based antioxidant (D) and the organic sulfur based compound (C) (((B)+(D))/(C) molar ratio) in the polyamide resin composition is preferably from 0.5 to 10.0.

By making each of the content ratios fall within the foregoing range, the heat aging resistance can be efficiently enhanced while keeping the barrier properties.

Also, in the polyamide resin composition of the present invention, one kind or plural kinds of resins such as a polyamide other than the polyamide (A), a polyester, a polyolefin, a polyphenylene sulfide, a polycarbonate, and the like can be blended within the range where the purpose is not impaired.

Above all, a polyamide other than the polyamide (A) can be preferably blended. More preferably, an aliphatic polyamide resin can be blended. The aliphatic polyamide resin is preferably used because it is able to improve mechanical physical properties of a molded article. As the aliphatic polyamide resin, nylon 6, nylon 66, nylon 11, nylon 12, nylon 46, nylon 610, nylon 612, nylon 666, and so on can be used singly or plurally.

The polyamide resin composition of the present invention may contain an inorganic filler. By using the inorganic filler, the rigidity and dimensional stability of the molded article can be enhanced. The inorganic filler includes a variety of fillers having a fibrous, powdered, granular, plate-like, cloth-like or mat-like shape. Examples thereof include glass fiber, carbon fiber, graphite fiber, carbon black, calcium carbonate, talc, catalpo, wollastonite, silica, alumina, diatomaceous earth, clay, kaolin, mica, granular glass, glass flake, hollow glass, gypsum, red iron oxide, metal fiber, titanium dioxide, potassium titanate whisker, aluminum borate whisker, magnesium oxide, calcium silicate, sodium aluminate, calcium aluminate, aluminum, aluminum oxide, aluminum hydroxide, copper, stainless steel, zinc oxide, metal whisker, and so on.

To the polyamide resin composition of the present invention, additives such as a matting agent, a weather resistant stabilizer, an ultraviolet ray absorber, a nucleating agent, a plasticizer, a flame retarder, an antistatic agent, a color protection agent, a antigelling agent, a coloring agent, a release agent, and the like can be added within the range where the effects of the present invention are not impaired.

The polyamide resin composition of the present invention is required to have an oxygen permeability coefficient of not more than 1.5 cc·mm/m$^2$·day·atm at 23° C. and 75% RH. When the oxygen permeability coefficient falls within this range, the barrier properties against various gases such as fleon, carbon dioxide, hydrogen, an alcohol, and the like are favorable. The oxygen permeability coefficient is preferably not more than 1.2 cc·mm/m$^2$·day·atm, and more preferably not more than 0.7 cc·mm/m$^2$·day·atm.

<Molded Article>

A molded article comprising the polyamide resin composition of the present invention has both gas barrier properties and heat aging resistance and can be utilized for various automobile parts, electric product parts, and the like, and hence, it is preferable. In particular, as the molded article comprising the polyamide resin composition, hoses or tubes can be preferably used.

EXAMPLES

The present invention is hereunder described in more detail by reference to the Examples and Comparative Examples, but it should not be construed that the present invention is limited thereto. Incidentally, in the present Examples, various measurements were carried out in the following methods.

(1) Gas Barrier Properties

An oxygen permeability coefficient (cc·mm/m$^2$·day·atm) of a film was measured in an atmosphere at 23° C. and 75% RH or at 23° C. and 90% RH in conformity with JIS K7126. For the measurement, OX-TRAN 2/21, manufactured by Modern Controls Inc. was used. It is meant that the lower the value, the more favorable the gas barrier properties are.

(2) Heat Aging Resistance

First of all, a film was heat treated at 130° C. for hours by using a hot air dryer. Subsequently, a tensile characteristic of the film before and after the heat treatment was tested in conformity with JIS K7127, thereby determining a stress at break (MPa) (specimen width: 10 mm, chuck-to-chuck distance: 50 mm, tensile rate: 50 mm/min, measurement temperature: 23° C., measurement humidity: 50% RH). Incidentally, Strograph, manufactured by Toyo Seiki Seisaku-sho, Ltd. was used as an apparatus. A ratio of the stress at break before and after the heat treatment was defined as a strength retention rate, and the strength retention rate (%) was calculated according to the following expression (1). It is meant that the higher this strength retention rate, the more excellent the heat aging resistance is.

$$\text{Strength retention rate (\%)} = [\{\text{Stress at break (MPa) of film after heat treatment}\}/\{\text{Stress at break (MPa) of film before heat treatment}\}] \times 100 \quad (1)$$

(3) Melting Point and Glass Transition Temperature of Polyamide

A melting point and a glass transition temperature were determined by means of differential scanning calorimetry (DSC) by using DSC-60, manufactured by Shimadzu Corporation. With respect to a measurement condition, about 5 mg of a sample was subjected to temperature elevation under a condition at 10° C./min, and when the temperature reached 300° C., the sample was quenched and again subjected to temperature elevation under a condition at 10° C./min. Incidentally, an amorphous sample was measured as a sample obtained by boiling pellets and crystallizing them.

(4) Number Average Molecular Weight

A number average molecular weight was determined in terms of a value as reduced into PMMA by means of GPC measurement using HLC-8320GPC, manufactured by Tosoh Corporation. Incidentally, TSKgel Super HM-H was used as a column for measurement; hexafluoroisopropanol (HFIP) having 10 mmoles/L of sodium trifluoroacetate dissolved therein was used as a solvent; and a measurement temperature was set to 40° C. Also, a calibration curve was prepared by dissolving PMMA at six levels in HFIP and measuring the solution.

Production Example 1

Synthesis of Polyamide (A1)

After adipic acid (manufactured by Rhodia) was heated and melted at 170° C. within a reactor, 1,3-bis(aminomethyl)cyclohexane (manufactured by Mitsubishi Gas Chemical Company, Inc.) was gradually added dropwise to give a molar ratio to adipic acid of 1/1 while stirring the contents, and meanwhile, the temperature was elevated to 240° C. After completion of the dropwise addition, the temperature was elevated to 260° C. After completion of the reaction, the contents were taken out in a strand form and pelletized by a pelletizer. The obtained pellets were charged in a tumbler and subjected to solid phase polymerization under reduced pressure, thereby obtaining a polyamide (A1) having an adjusted molecular weight. Incidentally, as the 1,3-bis(aminomethyl)cyclohexane, a material whose cis-form/trans-isomer ratio had been adjusted to 74/26 in terms of a molar ratio was used. The polyamide (A1) had a melting point of 230° C., a glass transition temperature of 103° C., and a number average molecular weight of 30,000, and an oxygen permeability coefficient of 0.2 cc·mm/m$^2$·day·atm.

Production Example 2

Synthesis of Polyamide (A2)

A polyamide (A2) was synthesized in the same manner as that in Production Example 1, except that sebacic acid (TA grade, manufactured by Ito Oil Chemicals Co., Ltd.) was used in place of the adipic acid in the Production Example 1. The polyamide (A2) had a melting point of 189° C., a glass transition temperature of 84° C., a number average molecular weight of 50,000, and an oxygen permeability coefficient of 1.2 cc·mm/m²·day·atm.

Production Example 3

Synthesis of Polyamide (A3)

A polyamide (A3) was synthesized in the same manner as that in Production Example 1, except that in the Production Example 1, a mixed dicarboxylic acid of sebacic acid and adipic acid whose molar ratio is 4/6 was used in place of the sebacic acid. The polyamide (A3) had a melting point of 135° C., a glass transition temperature of 98° C., a number average molecular weight of 35,000, and an oxygen permeability coefficient of 0.6 cc·mm/m²·day·atm.

Example 1

100 parts by mass of the polyamide (A1) and 0.05 parts by mass of N,N'-di-2-naphthyl-p-phenylenediamine (Nocrac White, manufactured by Ouchi Shinko Chemical Industrial Co., Ltd.) were dry blended and extrusion molded with a two-screw extruder equipped with a screw having a diameter of 30 mm and a T-die, thereby obtaining a 100 μm-thick film.

By using the foregoing film, the foregoing gas barrier properties and heat aging resistance were evaluated. The evaluation results are shown in Table 1.

Examples 2 to 14

Films were obtained in the same manner as that in Example 1, except that the polyamide resin composition in Example 1 was changed to each of those described in Table 1, and then evaluated in the same manner. The evaluation results are shown in Table 1.

Comparative Examples 1 to 2

Films were obtained in the same manner as that in Example 1, except that the polyamide resin composition in Example 1 was changed to each of those described in Table 1, and then evaluated in the same manner. The evaluation results are shown in Table 1.

Example 15

The polyamide and additive used in Example 2 and nylon 6 (manufactured by Ube Industries, Ltd., grade: 1020B) were dry blended in a mass ratio ((polyamide and additive)/(nylon 6)) of 3/7 (the addition amount of nylon 6 was 234.5 parts by mass based on 100 parts by mass of the polyamide resin (A1)) and molded with a single-screw extruder equipped with a screw having a diameter of 25 mm and a die, thereby obtaining a 200 μm-thick tubular molded article. A specimen for tensile strength measurement was cut out from the molded article and heat treated at 130° C. for 72 hours. A strength retention rate of the specimen after the heat treatment was 105%. Also, a specimen was cut out into a film form from the tubular molded article and measured for an oxygen permeability coefficient thereof. The evaluation results are shown in Table 1.

Incidentally, each of the abbreviations described in Table 1 is as follows.
- A1: Polyamide (A1) obtained in Production Example 1
- A2: Polyamide (A2) obtained in Production Example 2
- A3: Polyamide (A3) obtained in Production Example 3
- B1: N,N'-Di-2-naphthyl-p-phenylenediamine (Nocrac White, manufactured by Ouchi Shinko Chemical Industrial Co., Ltd.)
- B2: 4,4'-Bis(α,α-dimethylbenzyl)diphenylamine (Nocrac CD, manufactured by Ouchi Shinko Chemical Industrial Co., Ltd.)
- C1: Pentaerythritol tetrakis(3-laurylthiopropionate) (Sumilizer TP-D, manufactured by Sumitomo Chemical Co., Ltd.)
- C2: 2-Mercaptobenzimidazole (Sumilizer MB, manufactured by Sumitomo Chemical Co., Ltd.)
- C3: Dimyristyl-3,3'-thiodipropionate (Sumilizer TPM, manufactured by Sumitomo Chemical Co., Ltd.)
- D1: 3,9-Bis[2-[3-(3-t-butyl-4-hydroxy-5-methylphenyl)propionyloxy]-1,1-dimethylethyl]-2,4,8,10-tetraoxaspiro[5.5]undecane (Sumilizer GA-80, manufactured by Sumitomo Chemical Co., Ltd.)
- D2: N,N'-Hexamethylenebis(3,5-di-t-butyl-4-hydroxyhydrocinnamide) (Irganox 1098, manufactured by Ciba-Geigy AG)

As shown in the foregoing Examples, the polyamide resin compositions including (A) a polyamide containing a 1,3-bis (aminomethyl)cyclohexane unit and (B) an aromatic secondary amine based compound and/or (D) a phenol based antioxidant, all of which are constituent features of the present invention, had both very excellent barrier properties and heat aging resistance, whereas the polyamide resin compositions not satisfying the specified conditions were inferior in heat aging resistance.

TABLE 1

|  | Polyamide (A) (The ratio in the parenthesis is a mixing mass ratio) | Aromatic secondary amine compound (B) | Organic sulfur compound (C) | Phenol based antioxidant (D) | Others | (B)/(C) ratio (mass ratio) | (D)/(C) ratio (mass ratio) | Oxygen permeability coefficient (cc · mm/m² · day · atm) At 23° C. and 75% RH | At 23° C. and 90% RH | Strength retention rate (%) at 130° C. for 72 hours |
|---|---|---|---|---|---|---|---|---|---|---|
| Example 1 | A1 | B1 (0.05) | — | — | — | — | — | 0.2 | 0.1 | 121 |
| Example 2 | A1 | B1 (0.5) | — | — | — | — | — | 0.2 | 0.1 | 120 |
| Example 3 | A1 | B2 (0.02) | — | — | — | — | — | 0.2 | 0.1 | 110 |
| Example 4 | A1 | B2 (0.2) | — | — | — | — | — | 0.2 | 0.1 | 124 |
| Example 5 | A1 | — | — | D1 (0.3) | — | — | — | 0.2 | 0.1 | 100 |
| Example 6 | A2 | — | — | D2 (0.8) | — | — | — | 1.2 | 1.4 | 105 |
| Example 7 | A1 | B2 (0.2) | C1 (0.2) | — | — | 1.0 | — | 0.2 | 0.1 | 119 |
| Example 8 | A1 | B1 (0.1) | C2 (0.1) | — | — | 1.0 | — | 0.2 | 0.1 | 118 |
| Example 9 | A2 | B1 (1.0) | C3 (0.5) | — | — | 2.0 | — | 1.2 | 1.4 | 134 |

TABLE 1-continued

|  | Polyamide (A) (The ratio in the parenthesis is a mixing mass ratio) | Additives (The numeral in the parenthesis is addition parts by mass) | | | | (B)/(C) ratio (mass ratio) | (D)/(C) ratio (mass ratio) | Oxygen permeability coefficient (cc · mm/m² · day · atm) | | Strength retention rate (%) at 130° C. for 72 hours |
| --- | --- | --- | --- | --- | --- | --- | --- | --- | --- | --- |
|  |  | Aromatic secondary amine compound (B) | Organic sulfur compound (C) | Phenol based antioxidant (D) | Others |  |  | At 23° C. and 75% RH | At 23° C. and 90% RH |  |
| Example 10 | A3 | B1 (0.4) | C1 (0.05) | — | — | 8.0 | — | 0.60 | 0.64 | 128 |
| Example 11 | A1/A2 (50/50) | B2 (0.3) | C1 (0.6) | — | — | 0.5 | — | 0.70 | 0.75 | 119 |
| Example 12 | A1 | B1 (0.1) | — | D1 (0.1) | — | — | — | 0.2 | 0.1 | 111 |
| Example 13 | A1 | — | C1 (0.1) | D1 (0.1) | — | — | 1.0 | 0.2 | 0.1 | 115 |
| Example 14 | A1 | B1 (0.1) | C1 (0.1) | D1 (0.1) | — | — | — | 0.2 | 0.1 | 125 |
| Example 15 | A1 | B1 (0.1) | — | — | Nylon 6 (234.5) | — | — | 0.4 | 0.8 | 105 |
| Comparative Example 1 | A1 | — | — | — | — | — | — | 0.2 | 0.1 | 59 |
| Comparative Example 2 | A1 | — | C1 (0.5) | — | — | — | — | 0.2 | 0.1 | 65 |

The invention claimed is:

1. A polyamide resin composition, comprising:
(A) a polyamide comprising (a1) a diamine unit comprising a 1,3-bis(aminomethyl)cyclohexane unit and (a2) a dicarboxylic acid unit;
(B) an aromatic secondary amine compound;
(C) an organic sulfur compound; and
(D) a phenolic antioxidant,
wherein
a content ratio of the aromatic secondary amine compound (B) to the organic sulfur compound (C), (B)/(C) mass ratio, in the composition is from 0.5 to 10.0,
a content ratio of the phenolic antioxidant (D) to the organic sulfur compound (C), (D)/(C) mass ratio, in the composition is from 0.5 to 10.0, and
the composition has an oxygen permeability coefficient of not more than 1.5 cc·mm/m²·day·atm at 23° C. and 75% RH.

2. The composition of claim 1, wherein the diamine unit (a1) comprises 30% by mole or more of a 1,3-bis(aminomethyl)cyclohexane unit.

3. The composition of claim 1, wherein the diamine unit (a1) comprises 50% by mole or more of a 1,3-bis(aminomethyl)cyclohexane unit.

4. The composition of claim 1, wherein the dicarboxylic acid unit (a2) comprises 50% by mole or more of an α,ω-linear aliphatic dicarboxylic acid unit comprising from 4 to 20 carbon atoms.

5. The composition of claim 4, wherein the dicarboxylic acid unit (a2) comprises an adipic acid unit.

6. The composition of claim 4, wherein the dicarboxylic acid unit (a2) comprises a sebacic acid unit.

7. The composition of claim 1, wherein the aromatic secondary amine compound (B) comprises at least one selected from the group consisting of a compound comprising a diphenylamine skeleton, a compound comprising a phenylnaphthylamine skeleton, and a compound comprising a dinaphthylamine skeleton.

8. The composition of claim 1, wherein the aromatic secondary amine compound (B) comprises at least one selected from the group consisting of a compound comprising a diphenylamine skeleton and a compound comprising a phenylnaphthylamine skeleton.

9. The composition of claim 1, wherein the aromatic secondary amine compound (B) comprises at least one selected from the group consisting of N-phenyl-1-naphthylamine, p,p'-dialkyldiphenylamine (carbon number of alkyl group: 8 to 14), octylated diphenylamine, 4,4'-bis(α,α-dimethylbenzyl)diphenylamine, p-(p-toluenesulfonylamido)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, 2,2'-dinaphthylamine, 1,2'-dinaphthylamine, and 1,1'-dinaphthylamine.

10. The composition of claim 1, wherein the aromatic secondary amine compound (B) comprises at least one of N,N'-di-2-naphthyl-p-phenylenediamine and 4,4'-bis(α,α-dimethylbenzyl)diphenylamine.

11. The composition of claim 1, wherein the phenolic antioxidant (D) comprises at least one of 3,9-bis[2-[3-(3-tert-butyl-4-hydroxy-5-methylphenyl)propionyloxy]-1,1-dimethylethyl]-2,4,8,10-tetraoxaspiro[5.5]undecane and N,N'-hexamethylenebis(3,5-di-t-butyl-4-hydroxyhydrocinnamide).

12. The composition of claim 1, wherein the organic sulfur compound (C) comprises at least one selected from the group consisting of a mercaptobenzoimidazole comprising compound, a dithiocarbamic acid comprising compound, a thiourea comprising compound, and an organic thio acid comprising compound.

13. The composition of claim 1, wherein the organic sulfur compound (C) comprises at least one selected from the group consisting of a mercaptobenzoimidazole comprising compound and an organic thio acid comprising compound.

14. The composition of claim 1, wherein the organic sulfur compound (C) comprises at least one selected from the group consisting of 2-mercaptobenzoimidazole, 2-mercaptomethylbenzimidazole, dimyristyl-3,3'-thiodipropionate, distearyl-3,3'-thiodipropionate, and pentaerythritol tetrakis(3-laurylthiopropionate).

15. The composition of claim 1, wherein the organic sulfur compound (C) comprises at least one of pentaerythritol tetrakis(3-laurylthiopropionate), dimyristyl-3,3'-thiodipropionate, and 2-mercaptobenzimidazole.

16. A molded article, comprising the composition of claim 1.

17. The molded article of claim 16, which is a hose or a tube.

18. The composition of claim 1, wherein the composition has a strength retention of at least 125 in rate percent after heating at 130° C. for 72 hours.

* * * * *